April 1, 1952     W. DE FLIGUÈ     2,591,520
ELECTROMAGNETIC RELAY OR CONTACTOR
Filed March 9, 1949     3 Sheets-Sheet 1
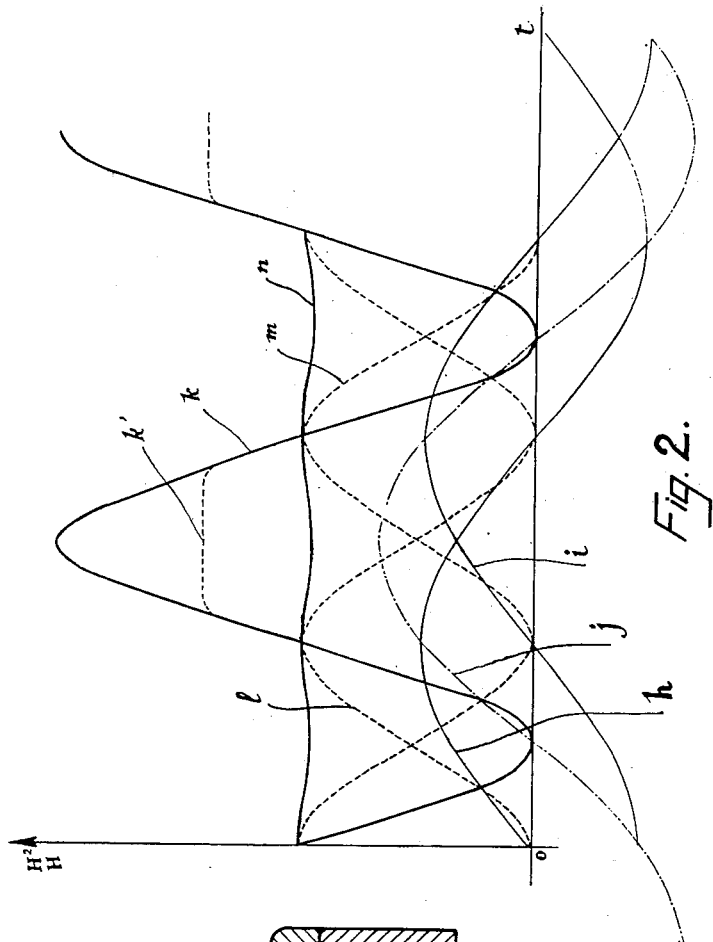
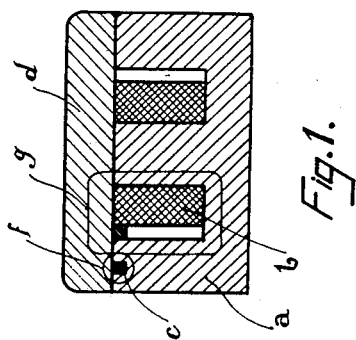
Inventor
Wladimir de Fliguè
by Stevens, Davis, Miller & Mosher
his attorneys

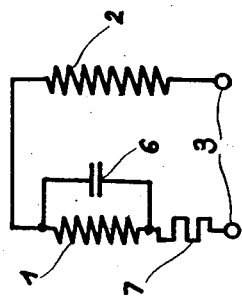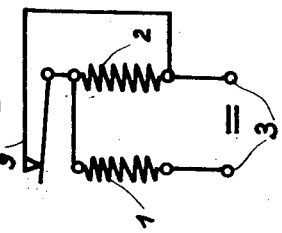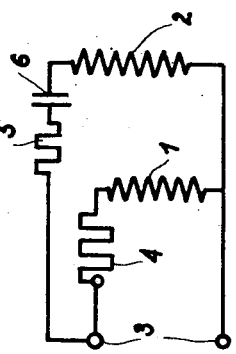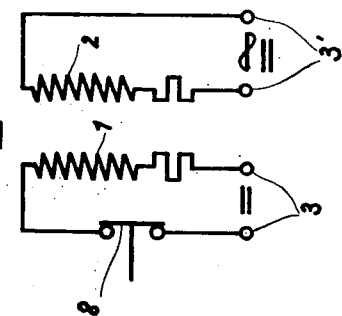

April 1, 1952 W. DE FLIGUE 2,591,520
ELECTROMAGNETIC RELAY OR CONTACTOR
Filed March 9, 1949 3 Sheets-Sheet 3
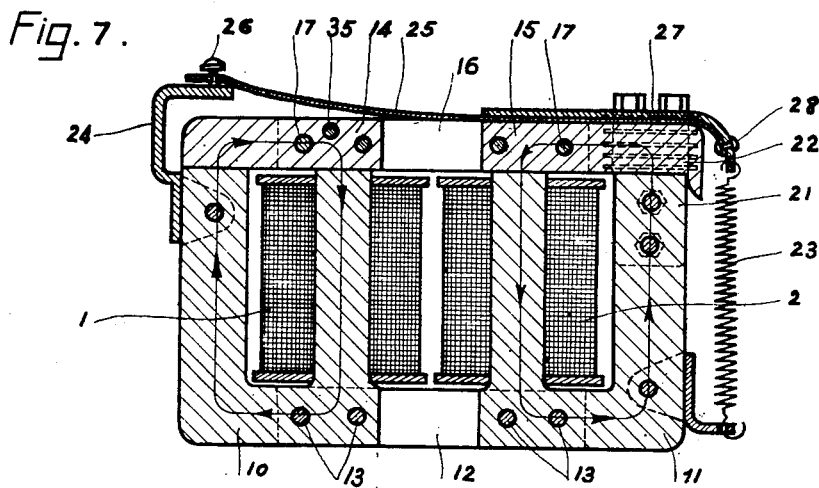
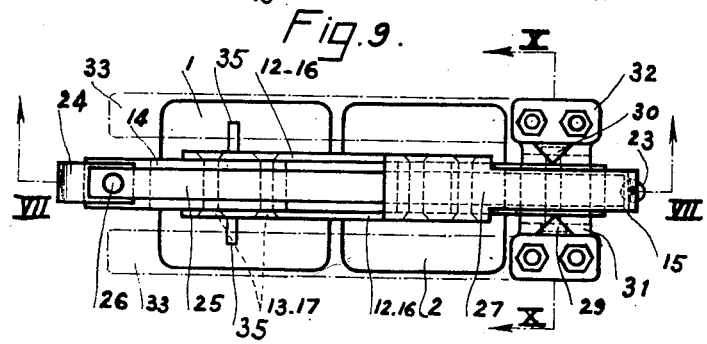
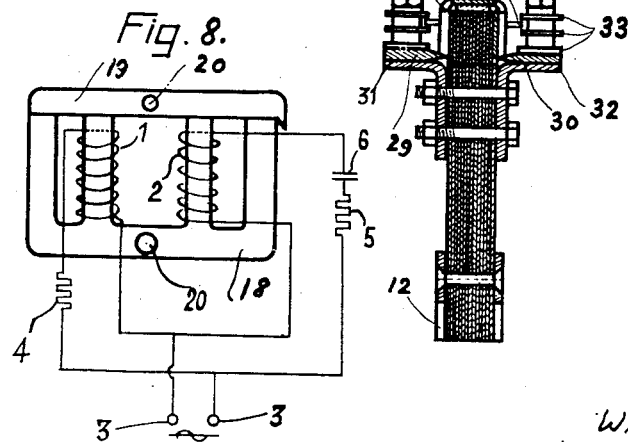

Patented Apr. 1, 1952

2,591,520

UNITED STATES PATENT OFFICE 2,591,520

ELECTROMAGNETIC RELAY OR CONTACTOR

Wladimir de Fligué, Paris, France

Application March 9, 1949, Serial No. 80,511
In France March 19, 1948

4 Claims. (Cl. 175—335)

The object of the present invention is to improve electromagnetic relays and contactors, in order to reduce the current consumption of these apparatus.

The relay or contactor, according to the invention, comprises at least two coils acting on a common movable part, said coils energizing independent magnetic circuits, i. e. circuits in which no common path practically exists for their lines of force.

The most interesting application of the invention is relative to alternating current relays; it also bears, as it will be apparent hereunder, an interest in the case of relays energized by direct or rectified currents, as well as in the case of relays energized by currents having a constant component and a periodical one.

In the particular case of alternating currents, the various coils of these relays or contactors are supplied with out-of-phase currents (the phase difference being preferably 90 degrees if only two coils are used). It is to be noted that owing to the complete or almost complete independence of the magnetic circuits, there does not practically exist mutual induction between the coils, and hence the difference in phase between the currents flowing through the coils is, according to the invention, obtained by appropriate means.

It is possible to use different sources of current, for instance several phases of a multiphase supply network.

It is also possible, resorting to a single phase current, to shift, by known electrical means such as resistors and condensers, the phase of the energizing current of each of the coils. Said means can be used for adjusting the difference in phase of currents supplied by different sources. If only two coils are used, the optimum difference in phase of the currents which flow therethrough is 90 degrees; however a more or less important phase difference included for instance between 60 and 120° is quite satisfactory.

In the simplest case of two coils, it is also possible to feed one of them with alternating current and the second one with direct or rectified current. The value of the latter may be such that it is sufficient for holding the relay switched on, but insufficient for switching on the switched off relay. In other words, the value of this current is reduced compared with the total consumption and it may be supplied by a low power source. In order to release the relay, it is enough to cut off the direct current. Thus a relay or contactor adapted to be reenergized without resorting to auxiliary contacts is designated.

In certain applications, it is convenient to reduce as much as possible the relay or contactor control current. This result may be achieved with direct current, by permanently supplying one of the two windings with a current whose value is slightly lower than that required for holding the armature in attracted position. The second winding is hence energized by a control current reduced to a minimum.

In electronical engineering currents having a direct component and a periodical one often occur. The relay, according to the present invention, is particularly appropriate for operation with such currents. Lastly, the invention enables, by a judicious choice of the electrical component members and by their arrangement, to make relays operating with direct or alternating voltage, i. e. universal relays.

The consumption of the relays and contactors designed according to the present invention, being reduced, this leads, in the case of common voltage networks to the use of impedances in series with the windings. In the most frequent practical case of supply by means of a single alternating current source, the difference in phase of the supply currents leads to the use of resistors and condensers.

The presence of the resistors and condensers in series causes the ratio of the operating current and of the contact current to be, in the relays and contactors according to the invention, much smaller than it is in common type contactors in which the variation of self-inductance between an open magnetic circuit and a closed one is considerable. That is why the contact current is often too large and it is advised to reduce it by introducing in the supply circuit, by means of an auxiliary contact, an impedance of convenient value. This is particularly appropriate for contactors of some importance. For the same reason, the relays and contractors according to the present invention allow being greatly oversupplied without risk of damaging the windings, contrarily to common type contactors.

In practice, the design of independent magnetic circuits, both as regards the core and the armature, offers no difficulty; it is enough to connect mechanically the magnetic elements constituting each of the portions of the circuit by assembling members of non-magnetic substance. It will often be enough to give rise to a relative independence by constituting each of the fixed or movable parts of the relay by a single magnetic member and by reducing its cross-section (by holes for instance) in its portions which connect circuits designed to be independent, thus increasing the magnetic reluctance of the connecting portions.

Other objects and advantages of the invention will be apparent during the course of the following description.

In the accompanying drawing forming a part of this application and in which like numerals are employed to designate like parts throughout the same, Fig. 1 shows a conventional relay, Fig. 2 illustrates the phenomena occurring in a conventional relay and in a relay according to the invention, Figs. 3, 4, 5 and 6 show a few examples of possible arrangement diagrams of a two-coil relay according to the invention, Fig. 7 is a longitudinal section taken along a bisecting plane of a two-coil relay (this figure corresponds to a section taken along line VII—VII of Fig. 9), Fig. 8 is, on a reduced scale, an elevation view of the magnetic circuits, Fig. 9 is a top plan view of the relay shown in section in Fig. 7, and Fig. 10 is a section taken along X—X of Fig. 9.

Fig. 1 shows the most widespread solution to prevent a relay or contactor supplied with alternating current, from vibrating and hence to render it silent.

One of the pole-pieces $a$ of the magnetic core energized by coil $b$, has a notch for setting therein a short-circuited conducting ring $c$.

The magnetic flux generated by coil $b$ induces a current to flow through ring $c$, said current giving rise to a flux differing in phase from the one generated by coil $b$.

A fraction of the magnetic flux generated by ring $c$ flows through the armature $d$ along lines of force such as $f$, whereas the remainder follows lines of force such as $g$ along the path of the lines of force produced by coil $b$.

The details of the magnetic phenomena are complex; yet it is possible to have an idea thereof by considering the graph shown in Fig. 2 in which the abscissae represent the times and the ordinates, the fluxes or their squares.

The sinusoid $h$ represents the flux generated by coil $b$ whereas the sinusoid $i$ represents the flux due to the ring $c$, this latter flux has, for the sake of clearness and simplicity of the drawing, been taken as equal in magnitude to that of coil $b$ and differing in phase by exactly 90 electrical degrees.

The flux on the common path of lines of force such as $g$, is obviously the sum of the two sinusoids $h$ and $i$, i. e. curve $j$.

This attraction of the armature resulting from that flux, is roughly proportional to the square of the latter and is represented by curve $k$ which has very prominent peaks and minimums at zero. The curves $j$ and $k$ immediately enable to realize that two equal currents differing in phase by 90° and energizing an entirely common magnetic circuit, cannot provide for an attraction which never cancels and that, as a matter of fact, this widely used device operates efficiently merely because a fraction of the magnetic flux induced by ring $c$ flows along lines $f$.

On the contrary, as regards the common path of the magnetic circuit, it is realized that, when the fluxes are in opposition, there is an obvious loss in power, whereas when they add, the benefit is low since the magnetic circuits are saturated, this flattening out, in practice, the attraction peak along dotted lines $k'$, so that the additional excitation entails a very reduced additional attraction.

Besides the heat evolved through Joule's effect in the short-circuited ring, the above considerations imply a fairly high consumption in conventional alternating current relays and contactors relatively to direct current relays and contactors. This consumption bears, besides the waste of current, numerous disadvantages which may be summarized as follows:

1. The relatively high consumption compels the use of sources able to supply sufficient power and which can only be controlled by bulky contacts, or occasionally by auxiliary relays.

2. The relays and contactors remote controlled through conductors having a small cross-section are under-energized and no longer offer the prescribed operation safety margin.

3. The power supplied to their coils heats the latter, this tending to damage them, especially in the case of boosted networks.

4. In the case of high power contactors and especially of relatively low voltages, this consumption leads to important currents requiring high cutting power control members, as well as large dimension feed conductors.

5. The weight of the armatures of these contactors is a fraction which is not negligible of their force of attraction. Hence, these apparatus are very responsive to gravity, even if their return actuation is not ensured thereby.

6. The network being stepped down, if the decreased attraction of the armature cannot overcome the elasticity of the contacts, the magnetic circuit of the contactor does not close. In this case, the energizing current remains near its operating value and the coil gets rapidly burnt.

If, on the contrary, in this same Fig. 2, the sinusoids $h$ and $j$ are supposed to represent the magnetic fluxes produced by two coils energizing two independent magnetic circuits, the attractive effects of each of these coils may be respectively represented by the curves $l$ and $m$ which correspond to the square of these fluxes.

The total attraction on the armature is no longer, in this case, the square of the sum of the fluxes, but the sum of their squares, as shown in the drawing by the curve $n$.

Contrary to curve $k$, this curve $n$ never cancels and is only slightly wavy. Without any complementary arrangement, the invention thus makes it possible to obtain, using alternating current, relays or contactors in which the attraction of the armature never cancels and shows only slight variations. Further, the loss due to Joule's effect is reduced and there are no fluxes in opposition. In practice, it is noted that a relay or contactor, according to the invention, consumes roughly the same power in alternating current as in direct current.

On the diagram shown in Fig. 3, coils 1 and 2 are arranged in parallel across the supply terminals 3. The circuit of coil 1 comprises a resistor 4 and that of coil 2 an optional resistor 5 and a condenser 6.

By conveniently proportioning the values of the elements 4, 5 and 6, it is possible, by supplying an alternating current of given voltage, to obtain out-of-phase currents nearly at 90° in the coils 1 and 2.

If terminals 3 are connected to a source of direct current, only coil 1 is energized by the current, but its power may be sufficient for enabling it to ensure alone the attraction of the armature of the relay.

If the source supplies a wavy current, its components are separated in the arrangement and each of coils 1 and 2 may be designed for providing a maximum attractive effect on the armature.

On the diagram of Fig. 4, coils 1 and 2 are arranged in series and condenser 6 is in parallel with one of the coils. Resistor 7 limits the intensity of the current.

In the case of alternating current, the currents flowing through each of the coils differ in phase; in direct current, both coils are supplied whereas, if the current comprises a direct component and a periodical one, the latter flows mainly through coil 2.

In the case of Fig. 5, both coils 1 and 2 are fed through terminals 3 and 3' respectively, by different current sources. A relay liable to be re-energized without auxiliary contact is thus obtained.

If it is supposed that coil 1 (Fig. 5) is fed for instance with direct or rectified current just sufficient to keep the armature in contact, but insufficient to cause the switching on of the relay, a current pulse sent to terminals 3' into coil 2 causes the actuation of the relay and the latter is held switched on owing to the current flowing therethrough. In order to release the relay, it is convenient to act, when opening, on button 8 inserted in the circuit of coil 1.

This diagram may also apply to a minimum control current relay. In this case, the current flowing through coil 1 is slightly lower than that necessary to hold the armature in contact.

Under these conditions, the direct or alternating current in coil 2 required for causing the relay to operate is very low.

On the diagram of Fig. 6, both windings 1 and 2 are arranged in series on terminals 3, but one of them, viz. winding 2, is short-circuited in the position of rest of the relay, by an auxiliary contact 9.

As soon as the relay is switched on, contact 9 opens, this causing the simultaneous flow through both coils and the reduction of the permanent feed current intensity.

The following figures show the design of a two-winding relay comprising practically independent magnetic circuits.

In the case of Figs. 7 and 9, each one of windings 1 and 2 is arranged on one arm of a U-shaped magnetic core (10 and 11). These two cores are linked to one another by lateral plates 12 of non-magnetic substance secured by means of bolts or rivets 13.

The armature of the relay is formed of two parts 14 and 15 adapted to close the magnetic circuits of cores 10 and 11 respectively, these parts being also linked by means of non-magnetic plates 16 and of bolts or rivets 17.

Instead of resorting to completely independent magnetic circuits, it is possible to use a single member of magnetic substance provided the cross-section of the portions connecting the two circuits are reduced for offering a high reluctance. Thus, in Fig. 8, both U-shaped cores form a single member in the shape of a four-tooth comb 18, and the armature is also formed of a single member of ferro-magnetic metal 19.

In order to reduce the passage cross-section for magnetic fluxes in the median connecting portions, holes of any shape are bored therethrough. It will be usually satisfactory to bore circular holes such as 20 if the core and armature are laminated along planes parallel to that of the figure.

In order that the life of these relays and contactors be only limited by the unavoidable wear of the contacts, it is convenient to do without the members liable to be worn out, such as the pivoting axles, and to replace them by cooperating angular portions 21 and 22, one of which is protruding and the other of which is re-entrant.

In order to ensure the application against one another of the two angular edges, besides the return spring 23, a holding spring 24 is used for exerting, through a strip 25, a longitudinal pull on the armature. For this purpose, the spring 24 is provided with a lug 26 crossing a hole in the free end of strip 25, whereas the other end of that strip is secured under plate 27. The latter is for instance, integral with the assembling plates 16 and is further used for fixing the return spring 23. Moreover, a riveting or a weld 28 prevents strip 25 from sliding longitudinally.

The arrangement of strip 25 ensures further the elastic suspension of the armature and prevents lateral displacements of its end facing spring 24.

For preventing lateral displacements of the other end of this armature, abutments 29 and 30 are provided which are carried by corner-plates 31 and 32 supporting, in a direction parallel to the main axis of the armature, the contact strips 33, insulated from each other in a known manner.

The armature is linked to the contact strips, for instance, through the ends of a small rod 35, preferably insulated, crossing the armature and applied on said strips.

In the embodiment shown, both magnetic circuits have been represented with their planes coinciding. These planes may also be arranged parallelly by placing the magnetic circuits side by side.

It is also possible to use more than two independent magnetic circuits, for instance three in the case of a three-phase current, and to arrange the three corresponding coils either side by side or in a row.

In Figs. 7 to 10, the electrical elements for phase shifting the currents flowing through the various coils, in the case of alternating current, have not been represented.

Referring to Figs. 3 to 6 showing a few examples of possible diagrams, the arrangement of these electrical elements can be greatly varied. Moreover, it is obvious that complementary electrical elements may be added, such as additional impedances allowing use with various voltages.

In order to obtain the phase difference between the various currents, different cross-sections of magnetic circuits may also be used, this causing the self-inductance of each coil to vary. In addition to that, resistors or condensers may be provided. As phase shifting means, the difference in the magnetic saturation of the magnetically insulated circuits can also be used. This result may be achieved by ensuring different consumptions to the coils.

The same result can be achieved by using different magnetic alloys for constituting each of the independent circuits.

As regards the armature or more precisely the whole assembly which constitutes it, various modifications may be made within the scope of the invention, for instance using a real axle or pivot provided occasionally with roller-bearings, equilibrating the movable part about its rotation axis for making it insensitive to gravity or impacts, replacing spring 23 by any convenient return means such as a permanent magnet or an electromagnet.

It is to be understood that the form of the invention herewith shown and described is to be taken as a preferred example of the same and that various changes in the shape, size and arrangement of parts may be resorted to without departing from the spirit of the invention or the scope of the subjoined claims.

What I claim is:

1. In an electromagnetic relay device, a rigid core comprising at least two separate portions of magnetic material adapted to constitute magnetic circuits connected through a bridging portion, said core being associated with a rigid armature comprising separate portions of magnetic material adapted to close simultaneously said magnetic circuits and connected through a bridging portion, at least one of said bridging portions having a substantially greater magnetic reluctance than said magnetic circuits; an energizing coil arranged on each of said first-mentioned separate portions; and means for supplying said coils with out-of-phase energizing currents.

2. In an electromagnetic relay device, a rigid laminated core of magnetic material including two U-shaped parts disposed in spaced side by side relation and having their open ends facing in the same direction, a bridging portion of magnetic material connecting the parts, a rigid armature overlying the open ends of the U-shaped parts and including a first end part disposed above the open end of one U-shaped part and a second end part disposed above the open end of the other U-shaped part, the end parts being connected by a bridging portion of magnetic material integral with said parts and connecting them together so that they simultaneously close on the U-shaped parts, an energizing coil arranged on one of the U-shaped parts and a second energizing coil arranged on the other of said U-shaped parts, means for supplying said coils with out-of-phase energizing currents and at least one of said bridging portions being perforated to achieve magnetic separation of the two circuits.

3. In an electromagnetic relay device, a rigid laminated core of magnetic material including two U-shaped parts disposed in spaced side by side relation and having their open ends facing in the same direction, a bridging portion of magnetic material connecting the parts, a rigid armature overlying the open ends of the U-shaped parts and including a first end part disposed above the open end of one U-shaped part and a second end part disposed above the open end of the other U-shaped part, the end parts being connected by a bridging portion of magnetic material integral with said parts and connecting them together so that they simultaneously close on the U-shaped parts, an energizing coil arranged on one of the U-shaped parts and a second energizing coil arranged on the other of said U-shaped parts, means for supplying said coils with out-of-phase energizing currents and at least one of said bridging portions being perforated to achieve magnetic separation of the two circuits, said coils being fed in parallel with single-phase alternating current, and a condenser disposed in series with one of said coils.

4. In an electromagnetic relay device, a rigid laminated core comprising built-up sheets of magnetic material including two U-shaped parts disposed in spaced relation with their open ends facing in the same direction, a bridging portion of magnetic material connecting the U-shaped parts in spaced relation, a rigid armature overlying the open ends of the U-shaped parts and including two magnetic end parts disposed above the open ends of the U-shaped parts and connected by a bridging portion of magnetic material for simultaneously closing on the open ends of the U-shaped parts, said armature being mounted on the outer leg of one of the U-shaped parts for swinging movement, means preventing axial and lateral displacement of the armature to retain the end parts in alignment with the open ends of the U-shaped parts, an energizing coil arranged on one of the U-shaped parts, a second energizing coil arranged on the other of the U-shaped parts, means for supplying said coils with out-of-phase energizing currents and at least one of said bridging portions being perforated to achieve magnetic separation of the two circuits.

WLADIMIR de FLIGUÉ.

REFERENCES CITED

The following references are of record in the file of this patent:

UNITED STATES PATENTS

| Number | Name | Date |
|---|---|---|
| 791,423 | Ihlder | May 30, 1905 |
| 969,809 | Simon | Sept. 13, 1910 |
| 2,068,682 | Keefe | Jan. 26, 1937 |
| 2,131,424 | Bechberger et al. | Sept. 27, 1938 |
| 2,332,985 | Warrington | July 4, 1944 |
| 2,426,062 | Sonnemann | Aug. 19, 1947 |
| 2,434,433 | Ray | Jan. 13, 1948 |
| 2,439,944 | Mehring | Apr. 20, 1948 |

FOREIGN PATENTS

| Number | Country | Date |
|---|---|---|
| 130,293 | Germany | May 1, 1902 |
| 307,318 | Germany | Aug. 14, 1918 |
| 532,429 | Great Britain | Jan. 23, 1941 |